US009928398B2

(12) United States Patent
Medina

(10) Patent No.: US 9,928,398 B2
(45) Date of Patent: Mar. 27, 2018

(54) ALWAYS-ON SENSOR DEVICE FOR HUMAN TOUCH

(71) Applicant: INVENSENSE, INC., San Jose, CA (US)

(72) Inventor: Eitan A. Medina, Palo Alto, CA (US)

(73) Assignee: INVENSENSE, INC., San Jose, CA (US)

( * ) Notice: Subject to any disclaimer, the term of this patent is extended or adjusted under 35 U.S.C. 154(b) by 133 days.

(21) Appl. No.: 14/827,515

(22) Filed: Aug. 17, 2015

(65) Prior Publication Data

US 2017/0053152 A1 Feb. 23, 2017

(51) Int. Cl.
G06K 9/00 (2006.01)
G06F 1/32 (2006.01)
G06F 3/041 (2006.01)
G06F 3/043 (2006.01)
H04W 52/02 (2009.01)

(52) U.S. Cl.
CPC ....... *G06K 9/00013* (2013.01); *G06F 1/3231* (2013.01); *G06F 1/3262* (2013.01); *G06F 1/3265* (2013.01); *G06F 3/041* (2013.01); *G06F 3/043* (2013.01); *H04W 52/0251* (2013.01); *H04W 52/0254* (2013.01); *G06F 2203/04105* (2013.01); *G06F 2203/04106* (2013.01); *Y02B 60/50* (2013.01)

(58) Field of Classification Search
None
See application file for complete search history.

(56) References Cited

U.S. PATENT DOCUMENTS

| 6,647,133 | B1* | 11/2003 | Morita | G06K 9/00013 340/562 |
|---|---|---|---|---|
| 7,067,962 | B2 | 6/2006 | Scott | |
| 7,109,642 | B2 | 9/2006 | Scott | |
| 7,369,690 | B2* | 5/2008 | Joo | G06K 9/0002 340/5.53 |
| 7,400,750 | B2 | 7/2008 | Nam | |
| 7,459,836 | B2 | 12/2008 | Scott | |
| 7,489,066 | B2 | 2/2009 | Scott et al. | |

(Continued)

FOREIGN PATENT DOCUMENTS

WO 2009137106 A2 11/2009
WO 2009147398 A2 12/2009

(Continued)

OTHER PUBLICATIONS

Perceptual and Biomechanical—Displays, Ki-Uk Kyung et al., 0-7695-2310-1, IEEE, pp. 1-6.*

(Continued)

*Primary Examiner* — Jayesh A Patel
(74) *Attorney, Agent, or Firm* — Amin, Turocy & Watson, LLP

(57) ABSTRACT

Always-on or nearly always-on sensing of human touch at a device is provided. The sensing is split into a low-power detection stage and a full-power analysis stage, where the detection stage is implemented continually or nearly continually and causes system circuitry to perform analysis of the human touch after the low-power detection stage has confirmed the human touch. The sensing permits avoiding the reliance on physical actuation of a trigger prior to analysis of human touch.

21 Claims, 6 Drawing Sheets

(56) References Cited

U.S. PATENT DOCUMENTS

| | | | |
|---|---|---|---|
| 7,739,912 B2 | 6/2010 | Schneider et al. | |
| 8,139,827 B2 | 3/2012 | Schneider et al. | |
| 8,311,514 B2* | 11/2012 | Bandyopadhyay | G06F 1/1643 455/410 |
| 8,335,356 B2 | 12/2012 | Schmitt | |
| 8,433,110 B2 | 4/2013 | Kropp et al. | |
| 8,446,383 B2* | 5/2013 | Miyazawa | G06F 3/041 178/18.01 |
| 8,508,103 B2 | 8/2013 | Schmitt et al. | |
| 8,515,135 B2 | 8/2013 | Clarke et al. | |
| 8,666,126 B2 | 3/2014 | Lee et al. | |
| 8,703,040 B2 | 4/2014 | Liufu et al. | |
| 8,723,399 B2 | 5/2014 | Sammoura et al. | |
| 8,805,031 B2 | 8/2014 | Schmitt | |
| 9,056,082 B2 | 6/2015 | Liautaud et al. | |
| 9,576,179 B2* | 2/2017 | Bae | G06K 9/00013 |
| 2007/0230754 A1 | 3/2007 | Jain et al. | |
| 2008/0012835 A1* | 1/2008 | Rimon | G06F 3/038 345/173 |
| 2008/0117183 A1* | 5/2008 | Yu | G06F 3/042 345/173 |
| 2008/0303798 A1* | 12/2008 | Matsudate | G06F 3/0412 345/173 |
| 2009/0244019 A1* | 10/2009 | Choi | G06F 3/0482 345/173 |
| 2009/0274343 A1 | 11/2009 | Clarke | |
| 2010/0099394 A1* | 4/2010 | Hainzl | G06F 1/32 455/418 |
| 2010/0251824 A1 | 6/2010 | Schneider et al. | |
| 2010/0239751 A1 | 9/2010 | Regniere | |
| 2010/0256498 A1 | 10/2010 | Tanaka | |
| 2010/0289772 A1 | 11/2010 | Miller | |
| 2011/0285244 A1 | 11/2011 | Lewis et al. | |
| 2012/0016604 A1 | 1/2012 | Irving et al. | |
| 2012/0092026 A1 | 4/2012 | Liautaud et al. | |
| 2012/0147698 A1 | 6/2012 | Wong et al. | |
| 2012/0279865 A1 | 11/2012 | Regniere et al. | |
| 2012/0288641 A1 | 11/2012 | Diatezua et al. | |
| 2012/0318957 A1* | 12/2012 | Lai | G06F 3/0428 250/206.1 |
| 2013/0127592 A1 | 5/2013 | Fyke et al. | |
| 2013/0133428 A1 | 5/2013 | Lee et al. | |
| 2013/0201134 A1 | 8/2013 | Schneider et al. | |
| 2014/0015800 A1* | 1/2014 | Chen | G06F 3/0421 345/175 |
| 2014/0091200 A1* | 4/2014 | Cheng | G06F 3/0423 250/206.1 |
| 2014/0104238 A1* | 4/2014 | Lu | G06F 3/042 345/175 |
| 2014/0176332 A1 | 6/2014 | Alameh et al. | |
| 2014/0219521 A1 | 8/2014 | Schmitt et al. | |
| 2014/0355387 A1 | 12/2014 | Kitchens, II et al. | |
| 2014/0362013 A1* | 12/2014 | Nikoozadeh | G06F 3/0414 345/173 |
| 2015/0036065 A1 | 2/2015 | Yousefpor et al. | |
| 2015/0123931 A1 | 5/2015 | Kitchens et al. | |
| 2015/0169136 A1 | 6/2015 | Ganti et al. | |
| 2015/0186705 A1* | 7/2015 | Magi | G06K 9/0002 382/125 |
| 2015/0189136 A1 | 7/2015 | Chung et al. | |
| 2015/0220767 A1 | 8/2015 | Yoon et al. | |
| 2015/0261261 A1 | 9/2015 | Bhagavatula et al. | |
| 2015/0286312 A1 | 10/2015 | Kang et al. | |
| 2015/0371215 A1* | 12/2015 | Zhou | G06Q 30/02 705/71 |
| 2016/0078269 A1* | 3/2016 | Thornblom | G06K 9/0002 382/124 |

FOREIGN PATENT DOCUMENTS

| | | |
|---|---|---|
| WO | 2015009635 A1 | 1/2015 |
| WO | 2015112453 A1 | 7/2015 |
| WO | 2015120132 A1 | 8/2015 |
| WO | 2015131083 A1 | 9/2015 |

OTHER PUBLICATIONS

Handheld PDAs and Wearable Computing Devices, Linda Deneen, University of Minnesota Duluth, 2011, pp. 1-6.*

Savoia et al. "Design and Fabrication of a cMUT Probe for Ultrasound Imaging of Fingerprints" 2010 IEEE International Ultrasonics Symposium Proceedings; Publication [online] Oct. 2010 [retrieved Oct. 7, 2014] Retrieved from Internet: <http://ieeexplore.ieee.org/xpl/login.jsp?tp=&arnumber=5935836>; pp. 1877-1880.

Dausch et al. "Theory and Operation of 2-D Array Piezoelectric Micromachined Ultrasound Transducers" IEEE Transactions on Ultrasonics, Ferroelectrics, and Frequency Control, vol. 55, No. 11, Nov. 2008; Retrieved from Internet on [Dec. 9, 2014]: <https:llrti.org/pubs/dauschtuffcv55is11 p2484nov2008.pdf >.

Qiu et al. "Piezoelectric Micromachined Ultrasound Transducer (PMUT) Arrays for Integrated Sensing, Actuation and Imaging"; Sensors 2015, 15, 8020-8041; doi: 1 0.3390/s150408020; Retrieved from Internet [Dec. 9, 2015] : <http://www.mdpi.com/1424-8220/15/4/8020/pdf>.

International Search Report and Written Opinion for PCT Application Serial No. PCT/US2016/047334 dated Nov. 14, 2016, 12 pages.

* cited by examiner

ALWAYS-ON SENSOR DEVICE FOR HUMAN TOUCH

BACKGROUND

Conventional fingerprint sensing solutions are available and deployed in consumer products, such as smartphones and other type of mobile devices. Common fingerprint sensor technologies generally rely on (1) a sensor and (2) a processing element. When the sensor is turned on, the sensor can take or can direct the device to take an image, which is digitized (e.g., level of brightness is encoded into a digital format), and send the image to the processing element. The processing element can compare the image content to an existing database of recorded images in order to find a match to a pre-recorded fingerprint, for example. Yet, finger print sensors typically consume substantial amount of power (e.g., hundreds of μWatts to several mWatts) and, therefore, cannot be turned on continuously to prevent draining a device's battery too rapidly.

SUMMARY

The following presents a simplified summary of one or more of the embodiments in order to provide a basic understanding of one or more of the embodiments. This summary is not an extensive overview of the embodiments described herein. It is intended to neither identify key or critical elements of the embodiments nor delineate any scope of embodiments or the claims. This Summary's sole purpose is to present some concepts of the embodiments in a simplified form as a prelude to the more detailed description that is presented later. It will also be appreciated that the detailed description may include additional or alternative embodiments beyond those described in the Summary section.

The present disclosure recognizes and addresses, in at least certain embodiments, the issue of power consumption and lack of a power efficient always-on approach to sensing and analyzing human touch at a device. In one embodiment, the disclosure provides a device that includes always-on circuitry configured to implement a first stage comprising first operations including: detecting touch of a specific area of a touch-screen display device; and predicting that the touch is associated with a human finger based on a touch criterion. In response to the predicting, the always-on circuitry is further configured to implement other first operations including generating a control signal configured to cause a processor to wake-up from a power-off mode or a sleep mode; and sending the control signal to the processor. The device also includes system circuitry configured to implement a second stage in response to the control signal, the second stage comprising second operations including: analyzing biometric data of a human body associated with the human finger.

Other embodiments and various examples, scenarios and implementations are described in more detail below. The following description and the drawings set forth certain illustrative embodiments of the specification. These embodiments are indicative, however, of but a few of the various ways in which the principles of the specification may be employed. Other advantages and novel features of the embodiments described will become apparent from the following detailed description of the specification when considered in conjunction with the drawings.

DETAILED DESCRIPTION

Figure 1:
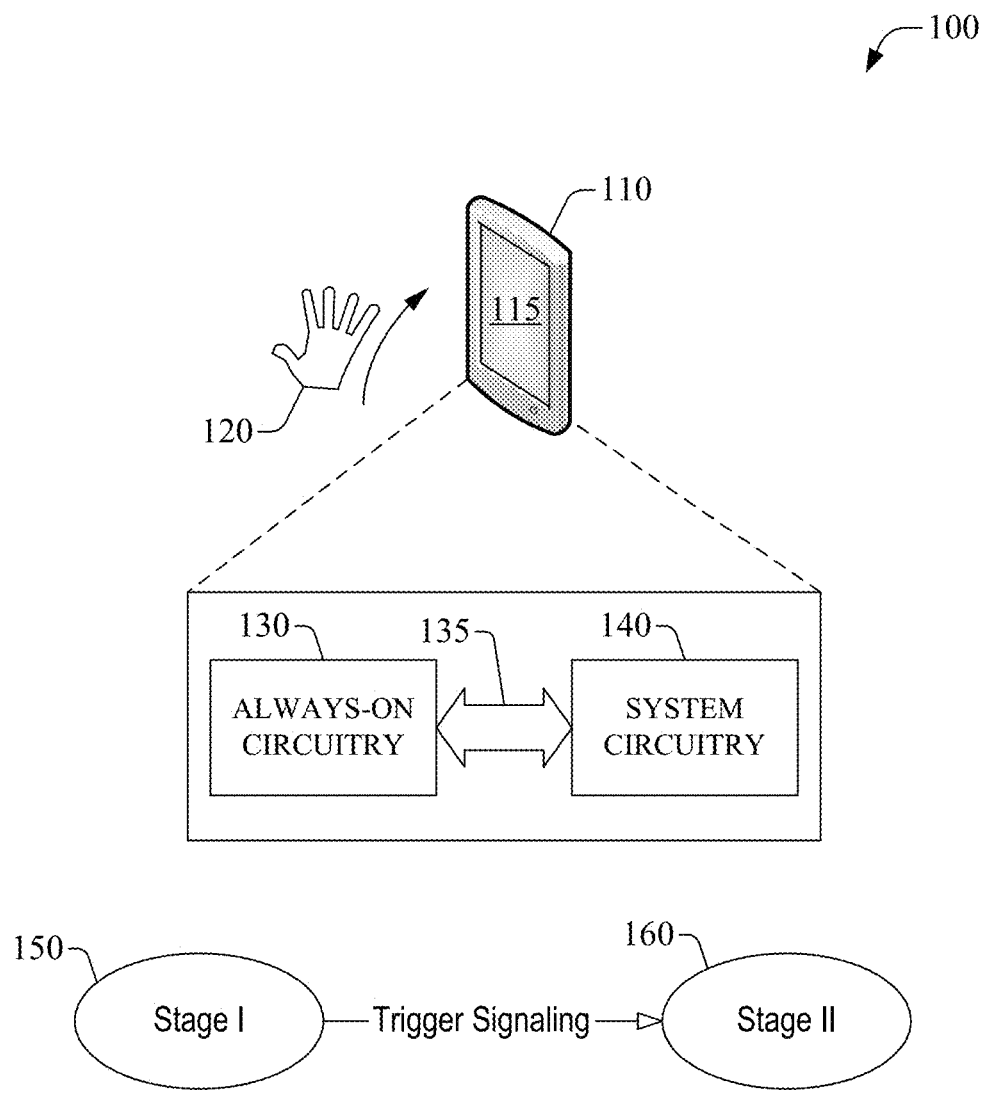
FIG. 1 illustrates an example of an operational environment in accordance with one or more embodiments of the disclosure.

The disclosure recognizes and addresses, in at least certain embodiments, the issue of power consumption and lack of a power efficient always-on approach to sensing and analyzing human touch at a device. To that end, embodiments of the disclosure permit or otherwise facilitate sensing of human touch that can be performed continually or nearly continually by separating a low-power detection stage from a full-power analysis stage. The detection stage is implemented continually or nearly continually and causes system circuitry to perform analysis of the human touch after the low-power detection stage has confirmed the human touch. Implementation of the low-power detection stage permits removal of physical actuation device (e.g., buttons or the like) while maintaining low power consumption. Absence of a physical actuation device does not hinder low-power consumption and does simplify user-device interaction when sensing human touch. While embodiments of the disclosure are illustrated with reference to a tablet computer, the disclosure is not limited in this respect and the embodiments of the disclosure can be applied to any device (mobile or otherwise) having a surface that is sensitive to touch and permits or otherwise facilitates control of the device by an end-user. Such a touch-sensitive surface can embody or can constitute, for example, a touch-screen display device. Mobile devices can be embodied in or can include consumer electronics devices (e.g., smartphones, portable gaming devices); vehicular devices (such as navigation and/or entertainment system device); medical devices; and the like. In addition, while some aspects of the disclosure are described with reference to a human finger and fingerprint analysis, embodiments of the disclosure are not so limited and can be applied, more generally, to the analysis of human body biometric data, such as blood pressure, pulse, blood pressure variation, blood flow parameters, etc., where a detail analysis of human touch at the device can be performed after a first stage detects that the device is (or, in some embodiments, has been) in contact with a human finger or other body part.

When compared to conventional technologies, embodiments of the disclosure can provide numerous improvements. For example, splitting the sensing of human touch into a low-power, always-on detection stage and a triggered, full-power analysis stage permits sensing human touch continuously or nearly continuously, without causing battery drainage or other inefficiencies. Therefore, embodiments of the disclosure permit removal of physical actuation triggers that are present in typical consumer electronics products, thus simplifying user-device interaction while sensing human touch. More specifically, rather than asking an end-user to provide some activation trigger (such as pressing a button) before the fingerprint sensing is turned on, for example, the low-power detection stage of the disclosure is implemented continually and trigger analysis when human touch is detected. For another example, in view of the removal of physical actuation device for human sensing, embodiments of the disclosure provide greater flexibility of product design. In one embodiment, a touch-screen display device can be implemented with a uniform (and fixed) screen without a button press section. As such, the touch-screen display device can provide always-on sensing of human touch while providing larger viewing area and lower manufacturing cost for a product incorporating embodiments of this disclosure. In contrast, conventional sensor technology can operate 100% of the time if a physical trigger is not desired, which would impose prohibitive power consumption demands.

With reference to the drawings, FIG. 1 illustrates an example of an operational environment for sensing of human touch in accordance with one or more embodiments of the disclosure. As illustrated, a device 110 includes a touch-screen display device 115 or other type of surface sensitive to touch. A human finger other body part, either represented by a hand 120, can touch a specific area of the touch-screen display device 115. The touch-screen display device 115 can be hard and need not include movable parts, such as a sensor button configured to detect human touch or otherwise cause the device 110 to respond to human touch. The device 110 can include circuitry that can operate in response to touch (human or otherwise) of the touch-screen display device 115 (or, in some embodiments, the other type of touch sensitive surface). More specifically, in one implementation, the device 110 can include always-on circuitry 130 and system circuitry 140. Such circuitry can be operatively coupled (e.g., electrically coupled, communicative coupled, etc.) via a bus architecture 135 (or bus 135) or conductive conduits configured to permit the exchange of signals between the always-on circuitry 130 and the system circuitry 140. In some embodiments, a printed circuit board (PCB) placed behind the touch-screen display device 115 can include the always-on circuitry 130, the system circuitry 140, and the bus 135. In one embodiment, the always-on circuitry 130 and the system circuitry 140 can be configured or otherwise arranged in a single semiconductor die. In another embodiment, the always-on circuitry 130 can be configured or otherwise arranged in a first semiconductor die and the system circuitry 140 can be configured or otherwise arranged in a second semiconductor die. In addition, in some embodiments, the bus 135 can be embodied in or can include a dedicated conducting wire or a dedicated data line that connects the always-on circuitry 130 and the system circuitry 140.

The always-on circuitry 130 can operate as sensor for human touch and the system circuitry 140, or a portion thereof, can permit or otherwise facilitate analysis of the human touch. The analysis can include fingerprint recognition or other types of biometric evaluations. The always-on circuitry 130 can be energized or otherwise power-on continuously or nearly continuously and can be configured to monitor touch of the touch-screen display device 115. In addition, in response to human touch (e.g., touch by a human finger or other human body part), the always-on circuitry can be further configured to trigger detection and/or another type of analysis of elements of the human touch or a human body associated therewith. To at least that end, the always-on circuitry 130 can be configured to implement a first stage, referred to Stage I 150, that can sense human touch and can generate trigger signaling in response. Stage I 150 can include numerous operations, including detecting touch of a specific area of a touch-screen display device 115. In some implementations, the touch can be detected according to information (e.g., data and/or signaling) received from a sensor (e.g., a capacitive sensor, a pressure sensor, a force sensor, an accelerometer, or the like) included in the device 110 and associated with the touch-screen display device 115. As such, in one example, detecting the touch can include utilizing static capacitive sensing of the touch. In addition or in another example, detecting the touch can include utilizing dynamic capacitive sensing of the touch. Further or in yet another example, detecting the touch can include utilizing optical imaging of the touch and/or ultrasonic imaging of the touch. Furthermore on in yet another example, detecting the touch can include utilizing pressure sensing of the touch.

In response to the detecting the touch, the operations of the Stage I 150 can include predicting that the touch is associated with a human body part (such as a finger) based on a touch criterion. As such, the always-on circuitry 130 can be configured to determine, within a specific accuracy, that the touch is associated with a human touch. The specific accuracy can be associated with a technique relied upon to predict that the detected touch is associated with a human touch. In some implementations, predicting that the touch can be associated with a human touch can include one or more of: (i) determining that a force greater than a first predetermined threshold (e.g., about 0.005 N, about 0.05 N, or about 0.5 N) was exerted on a surface of the touch-screen display device; (ii) determining that a pressure greater than a second predetermined threshold (e.g., about 50 Pa, about 500 Pa, or about 5000 Pa) was exerted on the surface of the touch-screen display device; (iii) determining that the specific area overlaps with a predetermined number of pixels (e.g., about 1 Gigapixels to about 3 Gigapixels) of the touch-screen display device within a predetermined range; or (iv) determining that the touch caused a defined frequency response. In addition or in other implementations, predicting that the touch can be associated with a human touch (via a finger or other body part, for example) can include determining that a first frequency response of a mass that causes the touch to acoustic sound corresponds to a second frequency response of the human finger to the acoustic sound.

Stage I 150 also includes operations responsive to a prediction that the touch of the touch-screen display device 115 is associated with a human touch. Specifically, in response to such a prediction, Stage I 150 includes generating trigger signaling (or, in some embodiments, other types of control signal) configured to direct or otherwise cause the system circuitry 140 or a portion thereof to wake up (e.g., to be energized) from a power-off mode or a sleep mode. In addition, Stage I 150 also can include sending the trigger signaling to the system circuitry 140 or the portion thereof (e.g., a processor). As such, the trigger signaling can act as a wake-up event for the system circuitry 140 or the portion thereof.

It is noted that implementation of Stage I 150 by the always-on circuitry 130 can replace the button press operation of conventional technologies, particularly, yet not exclusively, because the always-on circuitry 130 can operate as a low-power consumption element and, thus, can operate continuously or nearly continuously, without significantly impacting power consumption characteristics (e.g., battery life) of the device 110. For instance, in some examples, the always-on circuitry 130 can consume about 10 to about 100 times less power than a conventional button-operated fingerprint sensor. Consumption of power of the always-on circuitry 130 can be lower than conventional systems due to the implementation of the Stage I 150 being directed to establishing that a human has touched the touch-screen display device 115, without analyzing features of the touch (such as fingerprints). Therefore, implementation of the Stage I 150 can provide with a qualitative assessment of a touch, which assessment can be performed using less information (e.g., data and/or signaling from a sensor) and less power consumption than implementation of quantitative assessments of the touch (e.g., full fingerprint analysis)— such as the assessment implemented by the system circuitry 140 at the second stage. In addition, as described herein, implementation of the Stage I 150 can provide a trigger that can switch on the system circuitry 140 and the associated implementation of a second stage described herein. As long as the touch algorithm does not trigger the second stage, the system circuitry 140 can remain operating in a power-save mode or a sleep mode in order to minimize energy consumption of the device 110. The system circuitry 140 can receive the trigger signaling (or other type of control signal) and, in response, can be implement a second stage, referred to as Stage II 160, including operations for analysis of information (e.g., data and/or signaling) related to the human touch sensed by the always-on circuitry 130. More specifically, in certain implementations, the Stage II 160 can include operations such as analyzing biometric data of a human body associated with a human finger or other type of body part associated with the sensed human touch. Implementation of the Stage II 160 can permit determining, using an outcome of the analyzing the biometric data, a fingerprint of the human finger. In addition or in other embodiments, the Stage II 160 can include operations such as determining, using an outcome of the analyzing such biometric data, one or more of a blood pressure of the human body, a pulse of the human body, a blood flow parameter of the human body, or a blood glucose level of the human body. Specifically, in one example, the Stage I 150 can include receiving the biometric data from a biometric sensor communicatively coupled (via a bus, for example) to the always-on circuitry 130. As shown in the example embodiment in FIG. 2, the device 110 the biometric sensor or another type of medical device can be include in a group of sensor device(s) 220. Such data can be received at the always-on-circuitry 130, without energizing the system circuitry 140. The Stage I 150 can further include sending the biometric data to the system circuitry 140 or a portion thereof from the always-on circuitry 130. Such data can be sent, for example, in conjunction with the trigger signaling or other type of control information generated by the always-on circuitry 130 in response to ascertaining that human touch has occurred at the device.

The always-on circuitry 130 and the system circuitry 140 can have different complexity depending on numerous factors, such as type and/or form factor of the device 110. In one example, the always-on circuitry 130 can be embodied in or can include an application specific integrated circuit (ASIC) configured to perform or facilitate performance of at least a portion of the Stage I 150 described herein. In addition or in another example, the always-on circuitry 130 can be embodied in or can include a register-transfer level (RTL) processing circuit configured to perform or facilitate performance of the Stage I 150. Further or in yet another embodiment, the always-on circuitry 130 can be embodied in or can include a field-programmable gate array (FPGA) configured to perform or facilitate performance of the Stage I 150. Similarly, as an illustration, the system circuitry 140 can include an application processor and/or a processor of the device 110 or a host device that contains the system circuitry 140.

As described herein, in some embodiments, the always-on circuitry 130 and the system circuitry 140 can be configured in a mobile device (e.g., a smartphone, a tablet computer, a laptop computer). In other embodiments, the always-on circuitry 130 and the system circuitry 140 can be configured within a wearable device (e.g., a heart rate monitor, an insulin pump, or the like). It is noted that, in some scenarios, wearable devices may rely on or otherwise communicate with a mobile device (e.g., a smartphone, a tablet computer). Accordingly, in one of such scenarios, the always-on circuitry 130 and the system circuitry 140 can be distributed between a wearable device and the mobile device.

As described herein, implementation of Stage I 150 can be straightforward and low-power, permitting always-on operation. It is noted that in embodiments of this disclosure, it may not be critical to add complexity to the Stage I 150 in order to incorporate false-positive detection, e.g., falsely triggering Stage II 160. As long as false-positives are relatively few, a false-positive trigger of the Stage II 160 would merely result in a negative fingerprint detection or other type of computational exception, therefore causing the system circuitry 140 to consume, unnecessarily, a small amount of power in such relatively rare occasions. Accordingly, false positives in the Stage I 150 would have minor impact on battery life or other power resources of the device 110.

Figure 2:
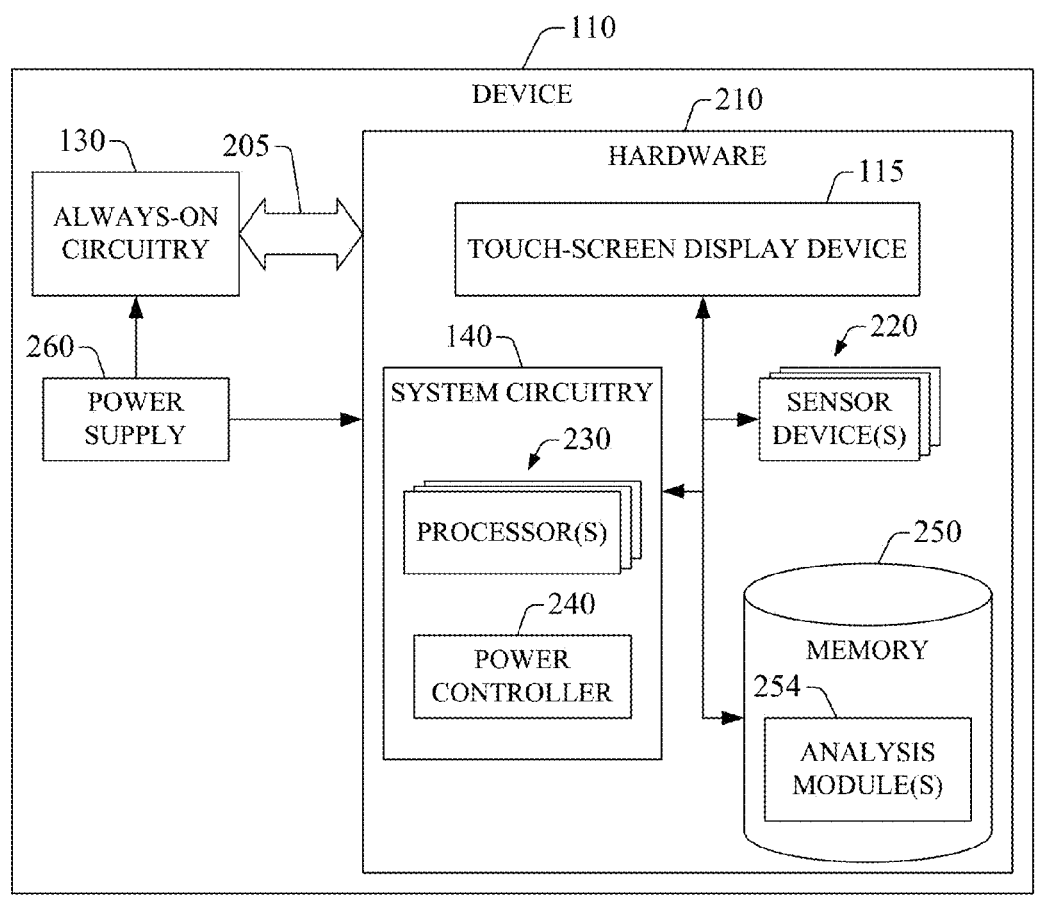
FIG. 2 illustrates an example of a device in accordance with one or more embodiments of the disclosure.

FIG. 2 illustrates an example embodiment of the device 110 in accordance with one or more embodiments of the disclosure. In the illustrated embodiment, the device 110 includes the always-on circuitry 130 operatively coupled to hardware 210 via a bus architecture 205. A power supply 260 can continually or nearly continually energize the always-on circuitry 130. The bus architecture 205 can include the bus 135 and can be embodied in or can include a system bus, an address bus, a control bus, a combination thereof, or the like. The hardware 210 can include numerous functional elements (e.g., components, platforms, I/O interfaces, connector, adapters, or the like) that individually or in combination can provide specific functionality to the device 110. For instance, if the device 110 embodies a smartphone, the hardware 210 can include a radio unit (not shown) which can include antenna(s) and processing circuitry that can permit or otherwise facilitate wireless communication between the device 110 and other devices (e.g., a base station or a wireless computing device). For the sake of clarity, at least some of such functional elements are not shown. As illustrated, the hardware 210 includes the touchscreen display device 115 and the system circuitry 140. The hardware 210 also includes one or more sensors 220 and one or more memory devices 250 (collectively referred to as memory 250).

The power supply 260 can energize at least a portion of the hardware 210 according with trigger signaling (or other type of control signal) provided (e.g., generated and transmitted) by the always-on circuitry 130 in accordance with aspects of this disclosure. More specifically, in the illustrated embodiment, the system circuitry 140 can include a power controller 20 that can receive trigger signaling (e.g., a control instruction) and, in response, can energize at least one processor of the processor(s) 230 from a power-save state to a full-power state. In the illustrated embodiment, the at least one processor that transitions from the power-save state to the full-power state can execute one or more analysis module(s) 254 in order to analyze features (e.g., fingerprints) of a human associated with the human touch that triggered the trigger signaling. In addition, in the illustrated embodiment, one or more of the sensor device(s) 220 can provide biometric data to the system circuitry 140 in order for the at least one processor that is energized to extract biometric elements from the biometric data. Specifically, in one example, the at least one processor can execute one or more of the analysis module(s) 254 and, based on an outcome of the execution, the at least one processor can determine one or more of a blood pressure of the human body, a pulse of the human body, a blood flow parameter of the human body, or a blood glucose level of the human body. At least one of the analysis module(s) 254 can include computer-accessible instruction (e.g., computer-readable instructions and/or computer-executable instructions) that in response to execution by a processor can permit or otherwise facilitate the device 110 to implement a defined algorithm (or process) for fingerprint identification or analysis. In response to execution, in certain implementations, such instructions also can permit or otherwise facilitate the device 110 to perform other type of analysis related to a health condition of a human associated with a detected human touch. The memory 250 also can include memory elements including data and/or instructions for analysis of human touch (e.g., fingerprint recognition, voice identification, or the like).

It is noted that in certain embodiments, at least one of the sensor(s) 220 can measure or otherwise collect biometric information in response to (e.g., during) the touch, such as it would be the case in which the device 110 embodies or includes a medical device. Such information can be sent to the always-on circuitry 130, which can send the biometric information to the system circuitry 140 in conjunction with, before, or after sending the trigger signaling.

Figure 3:
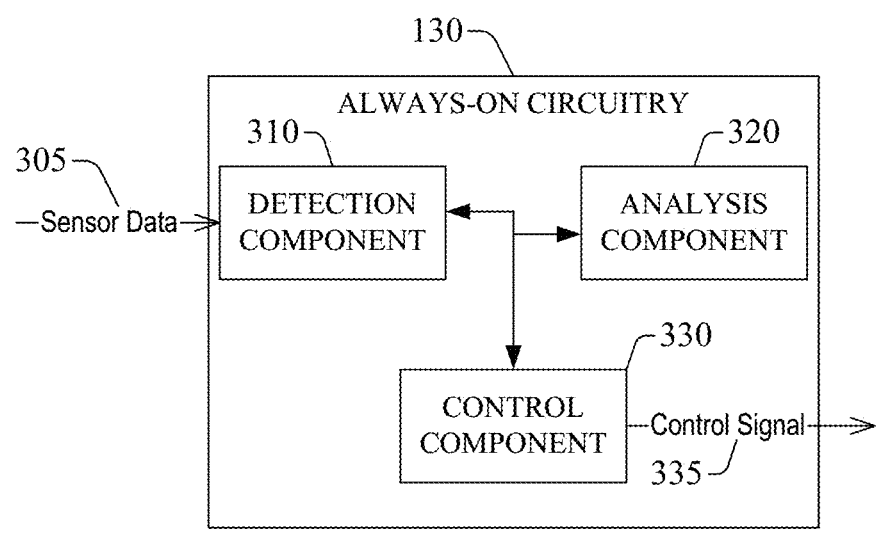
FIG. 3 illustrates an example of always-on circuitry in accordance with one or more embodiments of the disclosure.

FIG. 3 illustrates an example embodiment of the always-on circuitry 130 described herein. In the illustrated embodiment, the always-on circuitry 130 includes a detection component 310 can figured to detect touch of a specific area of a touch-screen display device or another type of touch-sensitive surface of a device (e.g., device 110) in accordance with aspects described herein. The detection component 310 can receive sensor data 305 or other type of information indicative or otherwise representative of touch. The sensor data 305 or the other information can be received from at least one of the sensor device(s) 220. In addition, in the illustrated embodiment, the always-on circuitry 130 can include an analysis component 320 to determine whether the touch is associated with a human finger or other human body part based at least on a touch criterion. To that end, in one example, the analysis component 320 can process at least a portion of the received sensor data 305. In certain implementations, the analysis component 320 can utilize or otherwise leverage imaging techniques (light and/or sound based techniques, for example). In addition or in other implementations, the analysis component 320 can utilize or otherwise leverage acoustic techniques, such as monitoring a frequency response to an acoustic wave of an object that touches the touch-screen display device and comparing such a response to the typical frequency response of a human body (typical finger mass) to acoustic sound. Such a technique does not rely on any pixel level processing and, therefore, can be implemented without having to use full-processor capability, e.g., the analysis component 320 can be embodied in firmware, such as a hard-coded RTL or an FPGA.

In response to ascertaining that the touch is associated with human touch, in the illustrated embodiment, the analysis component 320 can direct or otherwise cause a control component 330 to generate a control signal 335. In one scenario, the control signal can be configured to cause a processor (e.g., one of processor(s) 230) or other portion of a system circuitry (e.g., system circuitry 140) operatively coupled to the always-on circuitry 130 to wake-up from a power-off mode or a sleep mode. In the illustrated embodiment, the control component 330 also is configured to send the control signal 335 to the processor of the other portion of the system circuitry.

Figure 4:
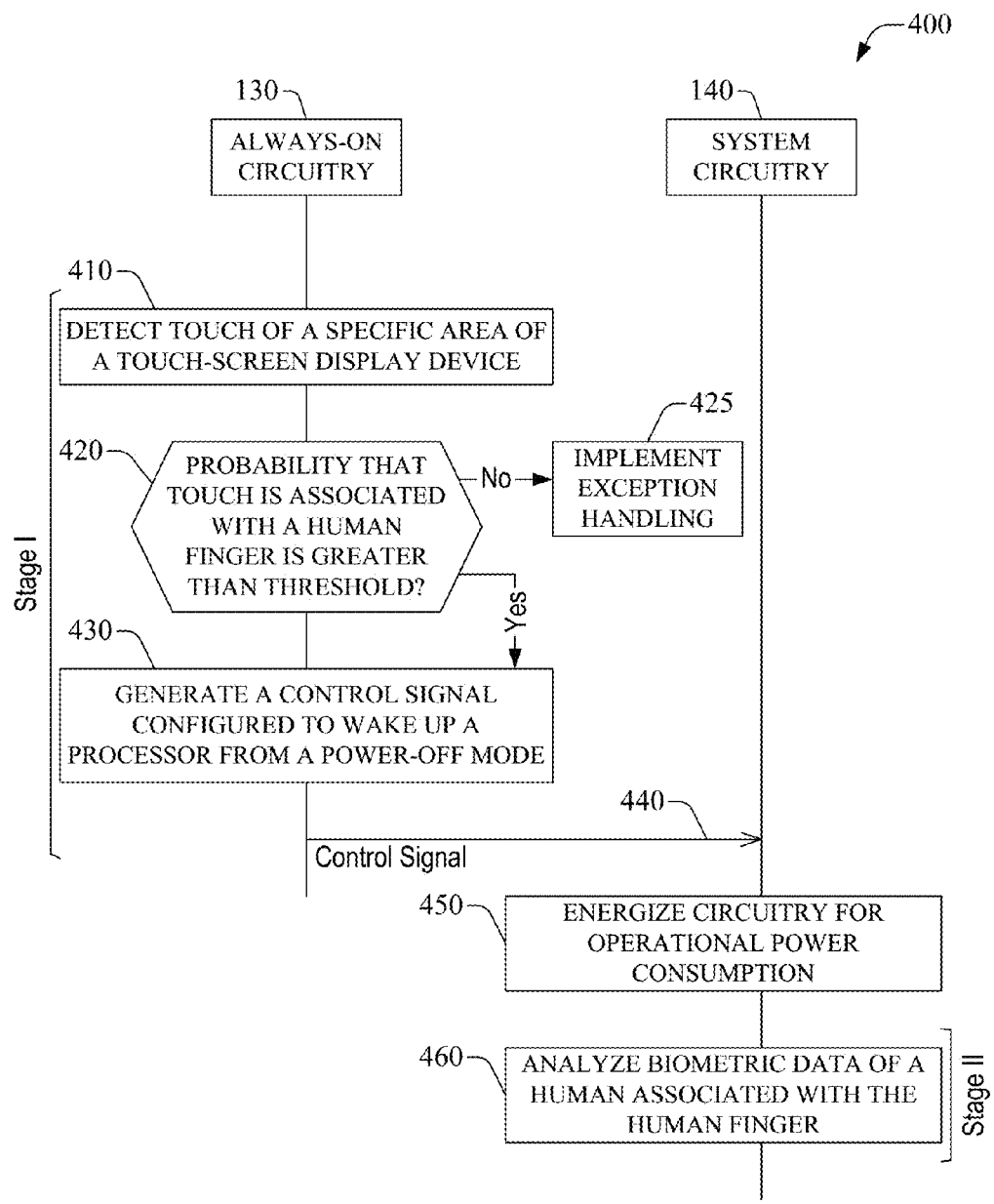
FIG. 4-6 illustrate examples of methods for monitoring human touch at a device in accordance with one or more embodiments of the disclosure.
Figure 5:
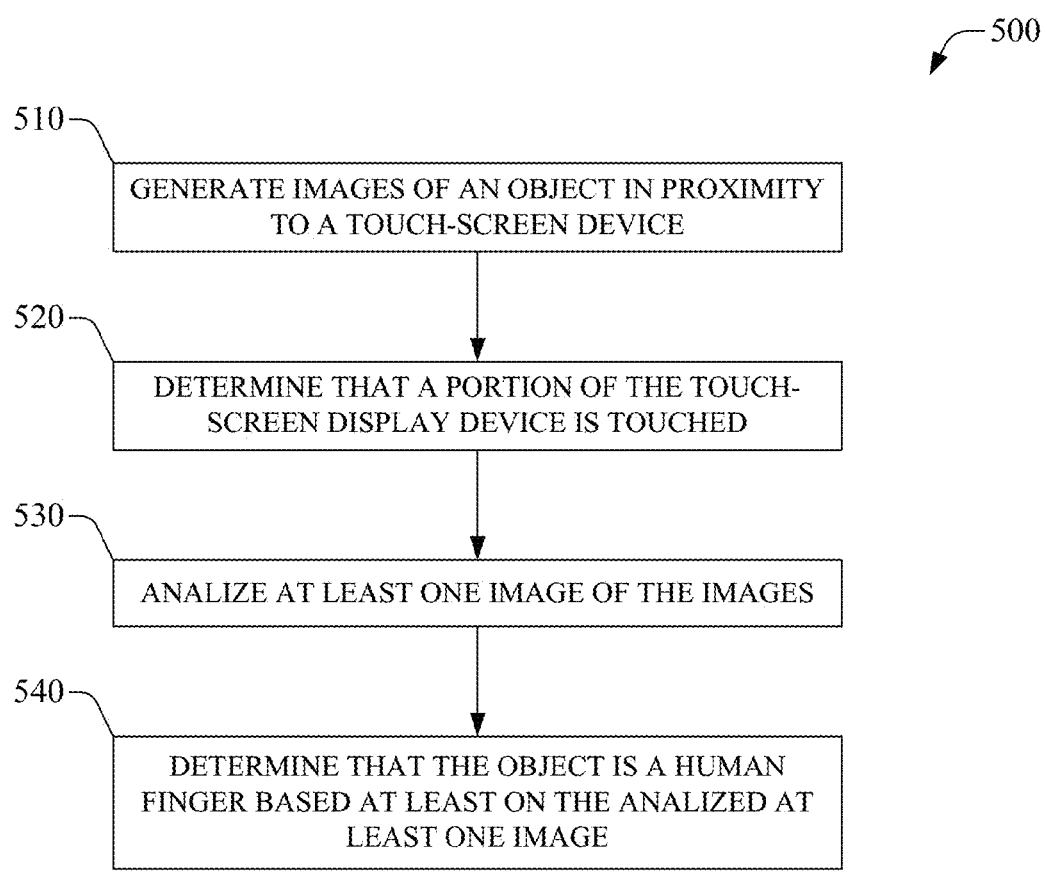
Figure 6:
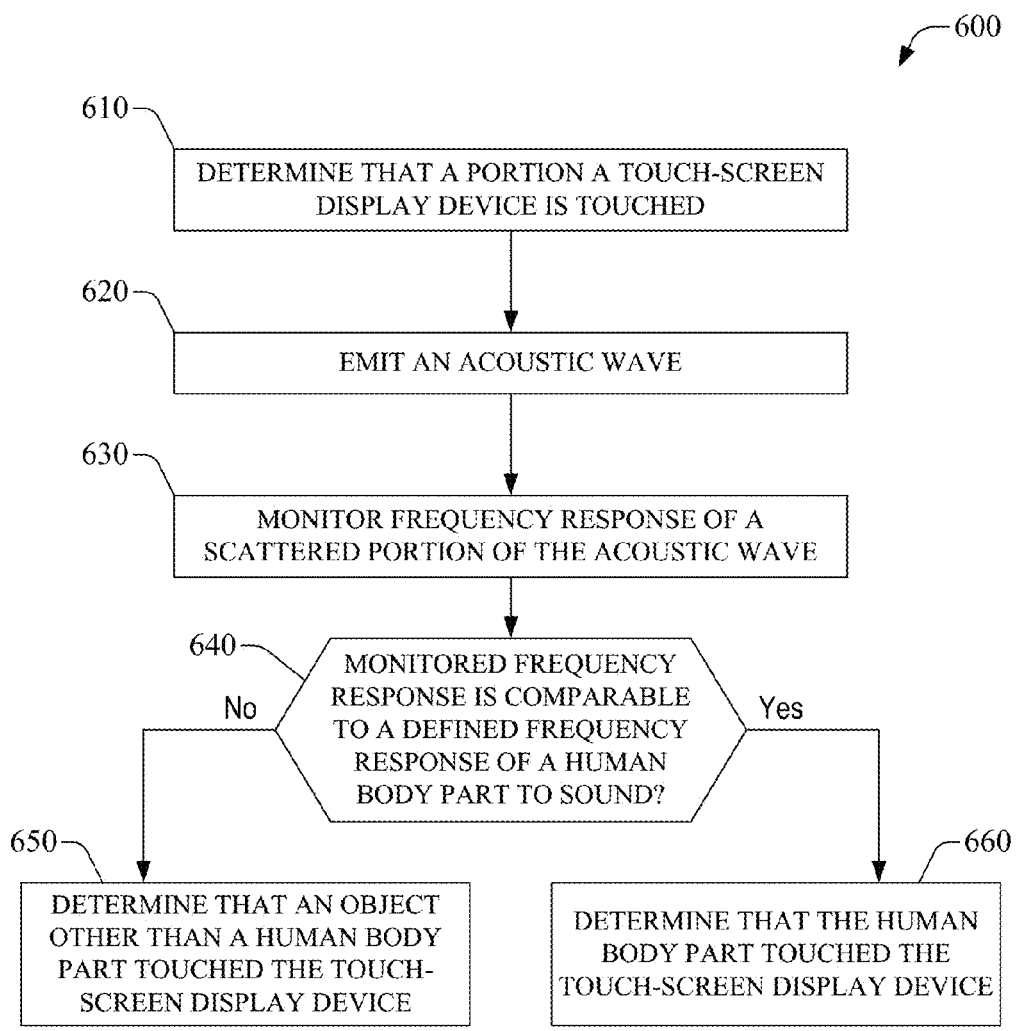

In view of the aspects described herein, example methods that can be implemented in accordance with this disclosure can be better appreciated with reference to FIGS. 4-6. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, one or more example methods disclosed herein can alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages described herein. It should be further appreciated that the example methods disclosed throughout the subject specification are capable of being stored on an article of manufacture to facilitate transporting and transferring such example methods to computers for execution, and thus implementation, by a processor or for storage in a memory.

Methods disclosed throughout the subject specification and annexed drawings are capable of being stored on an article of manufacture to facilitate transporting and transferring such methodologies to computers or other types of information processing machines for execution, and thus implementation, by a processor or for storage in a memory device or another type of computer-readable storage device. In one example, one or more processors that enact a method or combination of methods described herein can be utilized to execute programming code instructions retained in a memory device, or any computer- or machine-readable storage device or non-transitory media, in order to implement method(s) described herein. The programming code instructions, when executed by the one or more processor implement or carry out the various acts in the method(s) described herein. The programming code instructions provide a computer- or machine-executable framework to enact the method(s) described herein. More specifically, yet not exclusively, each block of the flowchart illustrations and/or combinations of blocks in the flowchart illustrations can be implemented by the programming code instructions.

FIG. 4 illustrates an example method 400 for sensing human touch in accordance with one or more embodiments of the disclosure. As illustrated, respective portions of the example method 400 can be implemented by the always-on circuitry 130 and the system circuitry 140. At block 410, the always-on circuitry 130 can detect touch of a specific area of a touch-screen display device or another type of touch-sensitive surface of a device (mobile or otherwise). At block 420, the always-on circuitry can determine whether a probability that the touch is associated with a human touch is greater than a defined threshold value. In response to ascertaining that such a probability is not greater than the defined threshold value ("No" branch), the always-on circuitry 130 can implement exception handling at block 425. In one instance, implementing the exception handling can include continuing assessing signals representative of touch of the touch-screen display device. In response to ascertaining that such a probability is greater than the defined threshold value ("Yes" branch), at block 430, the always-on circuitry can generate a control signal configured to wake up or otherwise energize a processor from a power-off mode. While not illustrated, in some embodiments, the processor can be energized from a power-save mode. In one implementation, the control signal can be embodied in or can include an interrupt signal. In addition or in other implementations, the processor can be included in the system circuitry 140. At block 440, the always-on circuitry 130 can send the control signal to the system circuitry 140. As described herein, the control signal can be sent via a bus or other type of communication conduit (vias, connectors, a combination thereof, or the like) that operationally couples the always-on circuitry 130 and the system circuitry 140.

The system circuitry 140 can receive the control signal and, in some embodiments, associated payload data. In response, the system circuitry 140 can energize the processor for operational power consumption. Specifically, in one example, the system circuitry 140 can supply an amount of power for the processor to provide or otherwise operate at full functionality. At block 460, the system circuitry 140 can analyze biometric data of a human associated with the human finger.

FIG. 5 presents an example method 500 for establishing that touch of a surface of a touch-screen device (or other type of touch-sensitive surface of the device) is associated with a human touch in accordance with one or more embodiments of the disclosure. In some embodiments, the example method 500 can embody or can constitute an implementation of blocks 410 and 420 in the example method 400. As such, the example method 500 can be implemented (e.g., executed) by a device including always-on circuitry in accordance with this disclosure. At block 510, the device can generate images of an object in proximity to the touch-screen device (or the other type of touch-sensitive surface). To at least that end, the device can include a camera and related processing circuitry (e.g., a graphical processing unit) configured to generate imaging information indicative or otherwise representative of the images.

At block 520, the device can determine that a portion of the touch-screen display device (or the other type of touch-sensitive surface) is touched. In response to such a determination, at block 530, the device can analyze at least one image of the images. The analysis can include, for example, application of computer-vision techniques to recognize an object that touched the touch-screen display device. Accordingly, the device can implement various image recognition processes in order to identify an object with a defined level of confidence (e.g., a defined probability). At block 540, the device that implements the example method 500 can determine that the object is a human finger—or, in some instances, other human body part, such as a palm, a foot, or the like—based at least on the analyzed at least one image.

FIG. 6 presents an example method 600 for establishing that touch of a surface of a touch-screen device (or other type of touch-sensitive surface of the device) is associated with a human touch in accordance with one or more embodiments of the disclosure. In some embodiments, the example method 600 can embody or can constitute an implementation of blocks 410 and 420 in the example method 400. As such, the example method 500 can be implemented (e.g., executed) by a device including always-on circuitry in accordance with this disclosure. At block 610, the device can determine that a portion of a touch-screen display device is touched. In response to such a determination, at block 620, the device can emit an acoustic wave (audible or otherwise). In certain implementations, the acoustic wave can be transmitted at low transmit power by a speaker or another type of haptic device configured to produce a pressure wave. It is noted that the disclosure is not so limited, and the device can emit the acoustic wave continuously, nearly continuously, periodically, or at scheduled times, without the emission being responsive to the touch. At block 630, the device can monitor frequency response of a scattered portion of the acoustic wave. The scattered portion of the acoustic wave can include reflections of the emitted acoustic wave from a surface of an object that touches the portion of the touch-screen display device.

At block 640, the device can determine whether the monitored frequency response is comparable to a defined frequency response of a human body part (e.g., a human finger) to sound. For instance, the device can compare the spectral distribution of power of the scattered acoustic wave to a defined spectral power distribution of acoustic waves reflected from a human body part (e.g., a human finger). Based on the comparison, the device can determine if a difference between such distributions is greater than a defined threshold value or less than the defined threshold value. Differences less than the defined threshold can be deemed to be comparable. The difference can be determined at a certain frequency or piece-wise (e.g., for a metric of the spectral distribution integrated over a range of frequencies).

In response to a determination that the monitored frequency response is not comparable to the defined frequency response ("No" branch), the device can determine, at block 650, that an object other than a human body part touched the touch-screen display device. In the alternative, in response to a determination that the monitored frequency response is comparable to the defined frequency response ("Yes" branch), the device can determine, at block 660, that the human body part touched the touch-screen display device.

In the present description, for purposes of explanation, numerous specific details have been set forth in order to provide a thorough understanding of the disclosure. It may be evident, however, that the subject disclosure may be practiced without these specific details. In other instances, well-known structures and devices are shown in block diagram form in order to facilitate describing the subject disclosure.

As used in this disclosure, including the annexed drawings, the terms "component," "system," "platform," "environment," "unit," "interface," and the like are intended to refer to a computer-related entity or an entity related to an operational apparatus with one or more specific functionalities, wherein the entity can be either hardware, a combination of hardware and software, software, or software in execution. One or more of such entities are also referred to as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include I/O components as well as associated processor, application, or Application Programming Interface (API) components. While the foregoing examples are directed to aspects of a component, the exemplified aspects or features also apply to a system, platform, interface, node, coder, decoder, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and doesn't necessarily indicate or imply any order in time.

The term "processor," as utilized in this disclosure, can refer to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. Moreover, a memory component can be removable or affixed to a functional element (e.g., device, server).

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various embodiments described herein can be implemented as a method, apparatus, or article of manufacture using standard programming and/or engineering techniques. In addition, various of the aspects disclosed herein also can be implemented by means of program modules or other types of computer program instructions stored in a memory device and executed by a processor, or other combination of hardware and software, or hardware and firmware. Such program modules or computer program instructions can be loaded onto a general purpose computer, a special purpose computer, or another type of programmable data processing apparatus to produce a machine, such that the instructions which execute on the computer or other programmable data processing apparatus create a means for implementing the functionality of disclosed herein.

The term "article of manufacture" as used herein is intended to encompass a computer program accessible from any computer-readable device, carrier, or media. For example, computer readable media can include but are not limited to magnetic storage devices (e.g., hard drive disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that one or more of the terms "includes," "including," "has," "have," or "having" is used in either the detailed description or the claims, such term is intended to be inclusive in a manner similar to the term "comprising" as "comprising" is interpreted when employed as a transitional word in a claim.

What is claimed is:

1. A device, comprising:
always-on circuitry configured to implement a first stage comprising first operations including:

detecting touch of a specific area of a touch-screen display device, wherein the detecting is performed by a capacitor sensor, a pressure sensor, a force sensor or an accelerometer;

predicting that the touch is associated with a human finger based on a touch criterion; and in response to the predicting, generating a control signal configured to cause a system circuitry to wake-up from a power-off mode or a sleep mode; and sending the control signal to the system circuitry; and the system circuitry configured to implement a second stage in response to the control signal, the second stage comprising second operations including:

analyzing biometric data of a human body associated with the human finger, and wherein the predicting further comprises determining that a first frequency response of a mass that causes the touch corresponds to a second frequency response of the human finger and determining that the specific area overlaps with a number of pixels of the touch-screen display device within a defined range.

2. The device of claim 1, wherein the predicting comprises at least one of: determining that a force greater than a first defined threshold was exerted on a surface of the touch-screen display device; determining that a pressure greater than a second defined threshold was exerted on the surface of the touch-screen display device; or determining that the touch caused a defined frequency response.

3. The device of claim 1, wherein the first operations further comprise:

receiving the biometric data from a biometric sensor communicatively coupled to the always-on circuitry.

4. The device of claim 3, wherein the first operations further comprise:

sending the biometric data to a processor from the always-on circuitry.

5. The device of claim 1, wherein the second operations further comprise:

determining, using an outcome of the analyzing, one or more of a blood pressure of the human body, a pulse of the human body, a blood flow parameter of the human body, or a blood glucose level of the human body.

6. The device of claim 1, wherein the second operations further comprise:

determining, using an outcome of the analyzing, a fingerprint of the human finger.

7. The device of claim 1, wherein the detecting comprises static capacitive sensing of the touch, dynamic capacitive sensing of the touch, optical imaging of the touch, ultrasonic imaging of the touch, or pressure sensing of the touch.

8. The device of claim 1, wherein the always-on circuitry comprises an application specific integrated circuit.

9. The device of claim 1, wherein the always-on circuitry comprises a register-transfer level processing circuit.

10. The device of claim 1, wherein the system circuitry comprises an application processor or a processor of a host device.

11. The device of claim 1, wherein the always-on circuitry and the system circuitry are configured in a single semiconductor die.

12. The device of claim 1, wherein the always-on circuitry is configured in a first semiconductor die and the system circuitry is configured in a second semiconductor die.

13. The device of claim 1, wherein the always-on circuitry and the system circuitry are configured within a mobile device.

14. The device of claim 1, wherein the always-on circuitry and the system circuitry are configured within a wearable device.

15. A method, comprising:

first stage operations including:

detecting, by an always-on circuitry, touch of a specific area of a touch-screen display device, wherein the detecting is performed by static capacitive sensing of the touch, dynamic capacitive sensing of the touch, optical imaging of the touch or ultrasonic imaging of the touch;

determining, by the always-on circuitry, that there is a probability greater than a defined threshold value that the touch is associated with a human finger; and in response to the determining, generating, by the always-on circuitry, a control signal configured to cause a processor to wake-up from a power-off mode or a sleep mode; and sending, by the always-on circuitry, the control signal to the processor; and performing second stage operations in response to the control signal, the second stage operations including:

analyzing, by a system circuitry, biometric data of a human body associated with the human finder, and wherein the determining further comprises determining that a first frequency response of a mass that causes the touch corresponds to a second frequency response of the human finger and determining that the specific area overlaps with a number of pixels of the touch-screen display device within a defined range.

16. The method of claim 15, wherein the first stage operations further include:

receiving, by power-on circuitry, the biometric data from a biometric sensor communicatively coupled to the always-on circuitry.

17. The method of claim 15, wherein the first stage operations further include:

sending the biometric data to the processor by the always-on circuitry.

18. The method of claim 15, wherein the second stage operations comprise:

determining, by the system circuitry, using an outcome of the analyzing, one or more of a blood pressure of the human body, a pulse of the human body, a blood flow parameter of the human body, or a blood glucose level of the human body.

19. The method of claim 15, wherein the second stage operations further include:

determining, by the system circuitry, using an outcome of the analyzing, a fingerprint of the human finger.

20. The method of claim 15, wherein the detecting comprises utilizing static capacitive sensing, utilizing dynamic capacitive sensing, utilizing optical imaging, utilizing acoustic imaging, or utilizing pressure sensing.

21. A non-transitory machine-readable storage device having executable instructions that, in response to execution, cause a device to perform operations comprising:

first stage operations including:

detecting touch of a specific area of a touch-screen display device, wherein the detecting is performed by optical imaging of the touch or ultrasonic imaging of the touch;

determining that there is a probability greater than a defined threshold value that the touch is associated with a human finger; and in response to the determining, generating a control signal configured to cause a processor to wake-up from a power-off mode or a sleep mode; and sending the control signal to the processor; and performing second stage operations in response to the control signal, the second stage operations including:

analyzing biometric data of a human body associated with the human finger, and wherein the determining further comprises determining that a first frequency response of a mass that causes the touch corresponds to a second frequency response of the human finger and determining that the specific area overlaps with a number of pixels of the touch-screen display device within a defined range.

* * * * *